(12) United States Patent
Takahashi (10) Patent No.: US 11,586,162 B2
(45) Date of Patent: Feb. 21, 2023

(54) METHOD OF UPDATING VALUE OF PARAMETER IN ESTIMATOR, STORAGE MEDIUM STORING COMPUTER PROGRAM, AND CONTROL SYSTEM

(71) Applicant: BROTHER KOGYO KABUSHIKI KAISHA, Nagoya (JP)

(72) Inventor: Eisuke Takahashi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 17 days.

(21) Appl. No.: 16/668,139

(22) Filed: Oct. 30, 2019

(65) Prior Publication Data

US 2020/0174431 A1 Jun. 4, 2020

(30) Foreign Application Priority Data

Nov. 30, 2018 (JP) .............................. JP2018-225744

(51) Int. Cl.
*G05B 13/04* (2006.01)
*G05B 11/36* (2006.01)
*G05B 13/02* (2006.01)

(52) U.S. Cl.
CPC .............. *G05B 13/04* (2013.01); *G05B 11/36* (2013.01); *G05B 13/027* (2013.01)

(58) Field of Classification Search
CPC ....... G05B 13/04; G05B 13/027; G05B 11/36
See application file for complete search history.

(56) References Cited

U.S. PATENT DOCUMENTS

| 5,988,856 A | * | 11/1999 | Braunstein | ............. | B41F 15/40 |
| | | | | | 700/160 |
| 6,339,685 B1 | * | 1/2002 | Okamoto | ................ | B65H 7/00 |
| | | | | | 270/58.01 |

(Continued)

FOREIGN PATENT DOCUMENTS

| JP | S62229402 A | 10/1987 |
| JP | H08249031 A | 9/1996 |

(Continued)

OTHER PUBLICATIONS

Notice of Reasons for Refusal dated Oct. 4, 2022 received in Japanese Patent Application No. JP 2018-225744.

*Primary Examiner* — Kenneth M Lo
*Assistant Examiner* — Tameem D Siddiquee
(74) *Attorney, Agent, or Firm* — Scully Scott Murphy & Presser (57) ABSTRACT

An aspect of this specification discloses a method of, based on a control input to a controlled object and on a control output from the controlled object, updating a value of a parameter in an estimator configured to estimate external force that acts on the controlled object. The method includes: determining whether the controlled object is in a particular state in which external force that acts on the controlled object is known; during a period in which it is determined that the controlled object is in the particular state, calculating, as a learning value, the value of the parameter that reduces an error between the known external force and estimated external force, the estimated external force being estimated by the estimator based on the control input and the control output;
and updating the value of the parameter in the estimator with the calculated learning value.

7 Claims, 6 Drawing Sheets

(56) References Cited

U.S. PATENT DOCUMENTS

| | | |
|---|---|---|
| 2011/0050146 A1 | 3/2011 | Okita et al. |
| 2013/0026963 A1 | 1/2013 | Sonoda et al. |
| 2014/0291926 A1 | 10/2014 | Iesaki |
| 2015/0008861 A1 | 1/2015 | Sonoda |
| 2015/0127160 A1 | 5/2015 | Yamaguchi |
| 2016/0075518 A1* | 3/2016 | Itoh ................ B65G 43/00 198/502.4 |
| 2016/0089911 A1* | 3/2016 | Takahashi ........ B41J 13/0009 347/16 |
| 2016/0347095 A1* | 12/2016 | Ogasawara ........ B41J 11/0065 |
| 2017/0074753 A1* | 3/2017 | Tian ................ G01M 13/025 |
| 2017/0090444 A1* | 3/2017 | Takahashi .......... G05B 13/024 |
| 2017/0255177 A1* | 9/2017 | Tokuda .............. G05B 17/02 |

FOREIGN PATENT DOCUMENTS

| | | |
|---|---|---|
| JP | 2011-072178 A | 4/2011 |
| JP | 2013-128387 A | 6/2013 |
| JP | 2014197319 A | 10/2014 |
| JP | 2015015844 A | 1/2015 |
| JP | 2015089579 A | 5/2015 |

* cited by examiner

METHOD OF UPDATING VALUE OF PARAMETER IN ESTIMATOR, STORAGE MEDIUM STORING COMPUTER PROGRAM, AND CONTROL SYSTEM

CROSS REFERENCE TO RELATED APPLICATIONS

This application claims priority from Japanese Patent Application No. 2018-225744 filed Nov. 30, 2018. The entire content of the priority application is incorporated herein by reference.

TECHNICAL FIELD

This disclosure relates to an updating method, a storage medium storing a computer program, and a control system.

BACKGROUND

A known technique is that a control input relative to an observation value of a control output is calculated by using an inverse model of a controlled object, and a parameter of the inverse model is estimated based on an error between the calculated control input and an observation value of the control input.

When the parameter of the inverse model coincides with a real controlled object, the above-mentioned error corresponds to magnitude of external force that acts on the controlled object. Thus, estimating the parameter with high accuracy serves to improve estimation accuracy of an estimator that estimates external force.

SUMMARY

However, in the above-mentioned estimation technique, a special drive command is inputted to the controlled object in order to estimate the parameter of the inverse model. Specifically, the controlled object is operated by inputting a sine wave command in order to estimate the parameter of the inverse model (specifically, inertia and friction). This kind of operation may cause a defect and malfunction of the controlled object.

In view of the foregoing, an aspect of an object of this disclosure is to provide a technique for appropriately setting a parameter (design variable) in an external force estimator without inputting a special drive command.

According to one aspect, this specification discloses a method of, based on a control input to a controlled object and on a control output from the controlled object, updating a value of a parameter in an estimator configured to estimate external force that acts on the controlled object. The method includes: determining whether the controlled object is in a particular state in which external force that acts on the controlled object is known; during a period in which it is determined that the controlled object is in the particular state, calculating, as a learning value, the value of the parameter that reduces an error between the known external force and estimated external force, the estimated external force being estimated by the estimator based on the control input and the control output; and updating the value of the parameter in the estimator with the calculated learning value.

According to another aspect, this specification also discloses a non-transitory computer readable storage medium storing a set of program instructions for updating a value of a parameter in an estimator configured to estimate external force that acts on a controlled object based on a control input to the controlled object and on a control output from the controlled object. The set of program instructions, when executed by a computer of a control system, causes the control system to perform: determining whether the controlled object is in a particular state in which external force that acts on the controlled object is known; during a period in which it is determined that the controlled object is in the particular state, calculating, as a learning value, the value of the parameter that reduces an error between the known external force and estimated external force, the estimated external force being estimated by the estimator based on the control input and the control output; and updating the value of the parameter in the estimator with the calculated learning value.

According to still another aspect, this specification also discloses a control system. The control system includes a controller, an estimator, and an updater. The controller is configured to control a controlled object. The estimator is configured to estimate external force that acts on the controlled object based on a control input inputted to the controlled object by the controller and on a control output from the controlled object. The updater is configured to update a value of a parameter in the estimator. The updater is configured to perform: determining whether the controlled object is in a particular state in which external force that acts on the controlled object is known; during a period in which it is determined that the controlled object is in the particular state, calculating, as a learning value, the value of the parameter that reduces an error between the known external force and estimated external force, the estimated external force being estimated by the estimator based on the control input and the control output; and updating the value of the parameter in the estimator with the calculated learning value.

BRIEF DESCRIPTION OF THE DRAWINGS

Embodiments in accordance with this disclosure will be described in detail with reference to the following figures wherein.

DETAILED DESCRIPTION

Some aspects of this disclosure will be described while referring to the attached drawings.

Figure 1:
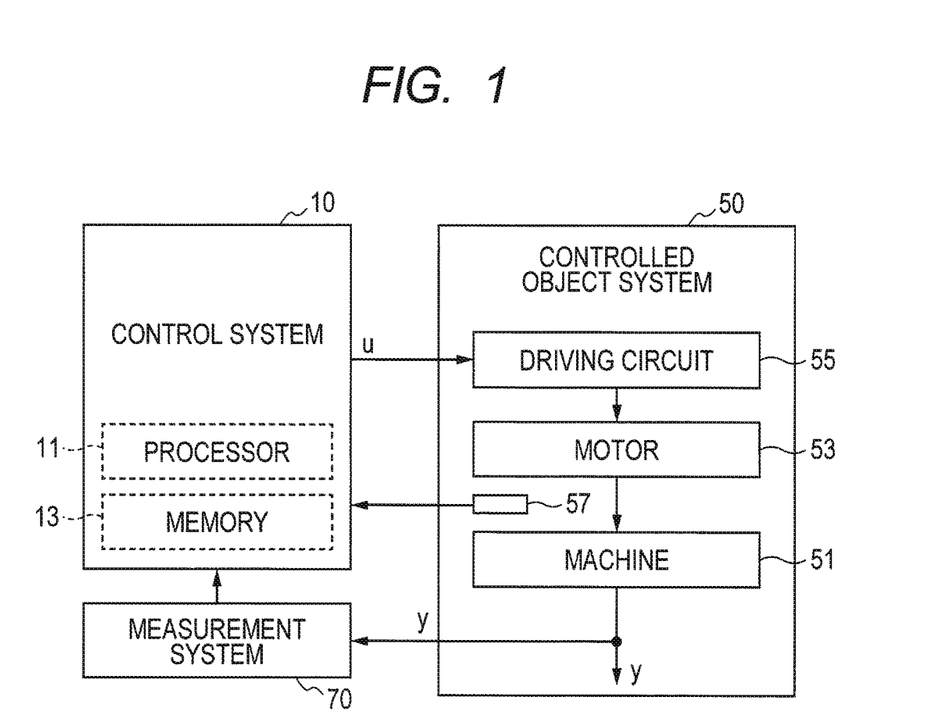
FIG. 1 is a block diagram showing the configuration of a control system and a controlled object system.

A control system 10 of the present embodiment shown in FIG. 1 is configured to control a mechanical state of a machine 51 in a controlled object system 50. Based on a physical quantity y relating to the state of the machine 51 measured by a measurement system 70 and on a target value r for the physical quantity y, the control system 10 calculates a control input u for the controlled object system 50 and controls the state of the machine 51.

The controlled object system 50 includes a motor 53, a driving circuit 55, and a sensor 57 as well as the machine 51. The motor 53 is a direct-current motor. The control input u is a driving current of the motor 53.

The driving circuit 55 is configured to, based on the control input u from the control system 10, apply a corresponding driving current to the motor 53. The machine 51 displaces by receiving power from the motor 53. Examples of the machine 51 include an articulated mechanism of a robot that is driven by the motor 53, and a sheet conveyance mechanism of an inkjet printer. The above-mentioned displacement includes a positional change due to linear movement and an angular change due to rotational movement of the machine 51

The measurement system 70 measures, as one of the physical quantity y, a velocity relating to displacement of the machine 51 (that is, the amount of displacement per unit time) or a velocity of the motor 53 having a proportional relation with that velocity. Hereinafter, the physical quantity y is also referred to as "control output y".

Figure 2:
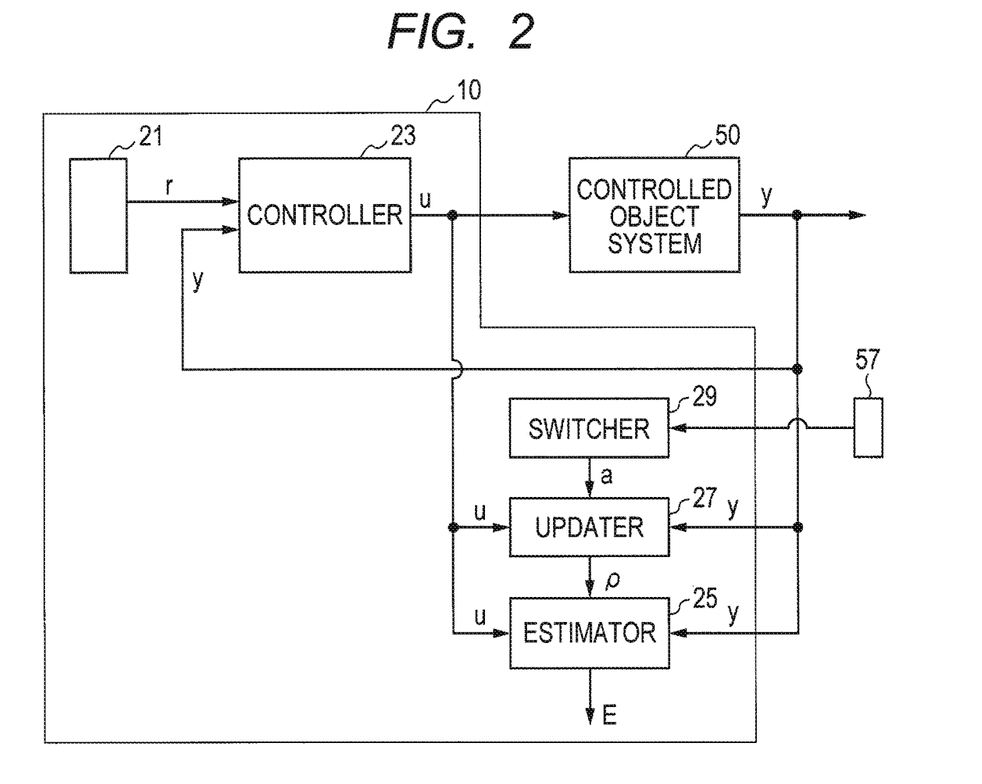
FIG. 2 is a block diagram showing the detailed configuration of the control system.

As shown in FIG. 2, the control system 10 includes a commander 21, a controller 23, an estimator 25, an updater 27, and a switcher 29. In one example, the control system 10 may include the commander 21, the controller 23, the estimator 25, the updater 27, and the switcher 29, in a dedicated circuit (for example, ASIC).

In another example, as shown in FIG. 1, the control system 10 may include a processor 11 and a memory 13, and the processor 11 may execute computer programs stored in the memory 13, thereby at least partially realizing the functions of the commander 21, the controller 23, the estimator 25, the updater 27, and the switcher 29.

The commander 21 is configured to input, to the controller 23, the target value r relating to the control output y. The controller 23 is a feedback controller configured to calculate the control input u by using a particular transfer function based on the control output y measured by the measurement system 70 and on the target value r inputted from the commander 21, and to input the calculated control input u to the controlled object system 50. The controller 23 calculates the control input u for reducing a deviation (r−y).

The estimator 25 is configured to estimate external force that acts on the controlled object system 50 based on the control input u from the controller 23 and on the measured control output y from the measurement system 70, and to output an external force estimation value E.

When the controlled object system 50 receives mechanical action from an external body, external force is generated in the controlled object system 50. The estimator 25 estimates this external force. The external force estimation value E is used for detection of abnormality and correction of the control input u, for example.

Figure 3:
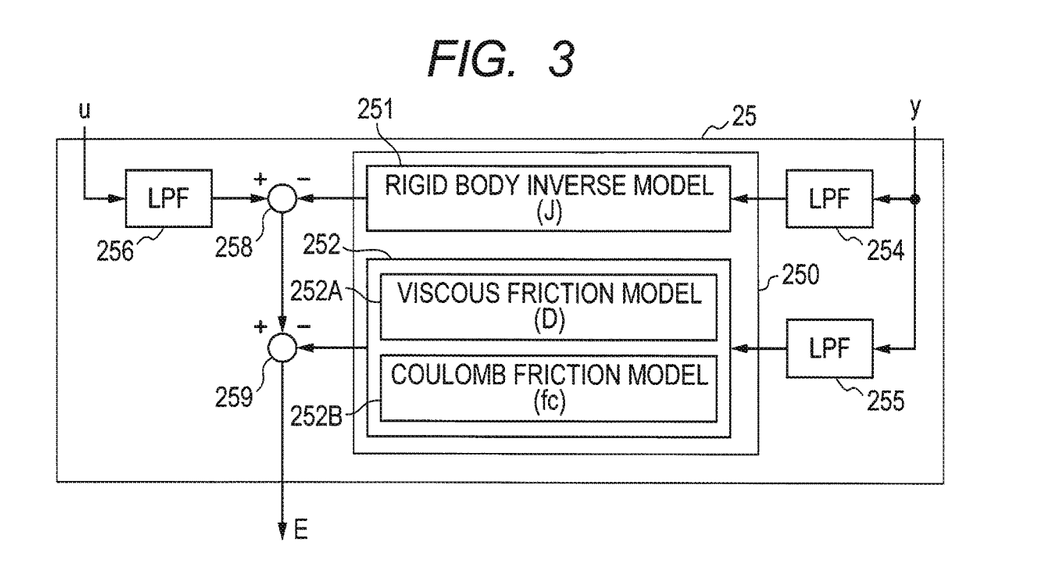
FIG. 3 is a block diagram showing the configuration of an estimator.

The estimator 25 shown in FIG. 3 includes an inverse model 250 corresponding to a transfer model of the controlled object system 50, low pass filters 254, 255, 256, and subtracters 258, 259. The transfer model of the controlled object system 50 mentioned above corresponds to a transfer function H (y=Hu) from the control input u to the control output y that is derived by modeling motions of the controlled object system 50. The inverse model 250 is an inverse model $H^{-1}$ of this transfer function H, which follows an expression $u=H^{-1}y$.

Specifically, the inverse model 250 includes a rigid body inverse model 251 and a friction model 252 of the controlled object system 50. The friction model 252 includes a viscous friction model 252A and a coulomb friction model 252B.

The rigid body inverse model 251 and the friction model 252 are configured to receive the control output y measured by the measurement system 70 through the low pass filters 254, 255, and to calculate theoretical control inputs u1, u2, u3 corresponding to the measured control output y.

Specifically, the rigid body inverse model 251 is an inverse model corresponding to a rigid body model of the controlled object system 50. The rigid body inverse model 251 calculates a control input u1 relating to rigid body motion of the controlled object system 50 based on an inertia J of the controlled object system 50 and on the control output y.

viscous friction model 252A calculates a control input u2 relating to viscous friction of the controlled object system 50 based on a viscous friction coefficient D of the controlled object system 50. The coulomb friction model 252B calculates a control input u3 relating to coulomb friction of the controlled object system 50 based on coulomb friction fc of the controlled object system 50. The friction model 252 inputs a total amount (u2+u3) of the calculated control input u2 and control input u3 to the subtracter 259.

The subtracter 258 receives the control input u from the controller 23 through the low pass filter 256, and calculates a difference u−u1 between the control input u and the control input u1. The subtracter 259 further subtracts a control input (u2+u3) from the difference u−u1 to calculate the external force estimation value E=u−u1−u2−u3.

The torque generated by the motor 53 is proportionate to driving current of the motor 53, in other words, the control input u. Thus, a difference (u−u1−u2−u3) between the control input u from the controller 23 to the controlled object system 50 and a control input (u1+u2+u3) calculated based on the inverse model 250 corresponds to external force that acts on the controlled object system 50, that is, a disturbance component that acts as reaction force.

The motion model of a rigid body is expressed by expression (1) below, by using a torque τ applied to the rigid body, the inertia J and the rotation velocity v of the rigid body, and the viscous friction coefficient D and the coulomb friction fc relating to friction that acts on the rigid body. A function sign( ) is a signum function.

[Expression 1]

$$J\frac{dv}{dt} = \tau - (Dv + f_c \text{sign}(v)) \tag{1}$$

Thus, the external force estimation value E is calculated in accordance with expression (2) below, based on the control output y corresponding to velocity of the motor 53. The "s" included in the expression (2) below is a Laplacian operator.

[Expression 2]

$$E = u - \{(Js+D)y + f_c \text{sign}(y)\} \tag{2}$$

The estimator 25 calculates the external force estimation value E in accordance with the expression (2) above, based on the control input u and the control output y from which high-frequency components have been removed by the low pass filters 254, 255, and 256.

The inertia J, the viscous friction coefficient D, and the coulomb friction fc included in the expression (2) are parameters of the estimator 25. By setting the inertia J, the viscous friction coefficient D, and the coulomb friction fc adapted to the real controlled object system 50, the estimator 25 calculates the external force estimation value E with high accuracy.

The updater 27 operates to learn the inertia J, the viscous friction coefficient D, and the coulomb friction fc of the controlled object system 50 and to update parameter ρ of the estimator 25, thereby maintaining or improving the estimation accuracy of the estimator 25. The parameter ρ mentioned above corresponds to a combination ρ=(J, D, fc) of the inertia J, the viscous friction coefficient D, and the coulomb friction fc.

Figure 4:
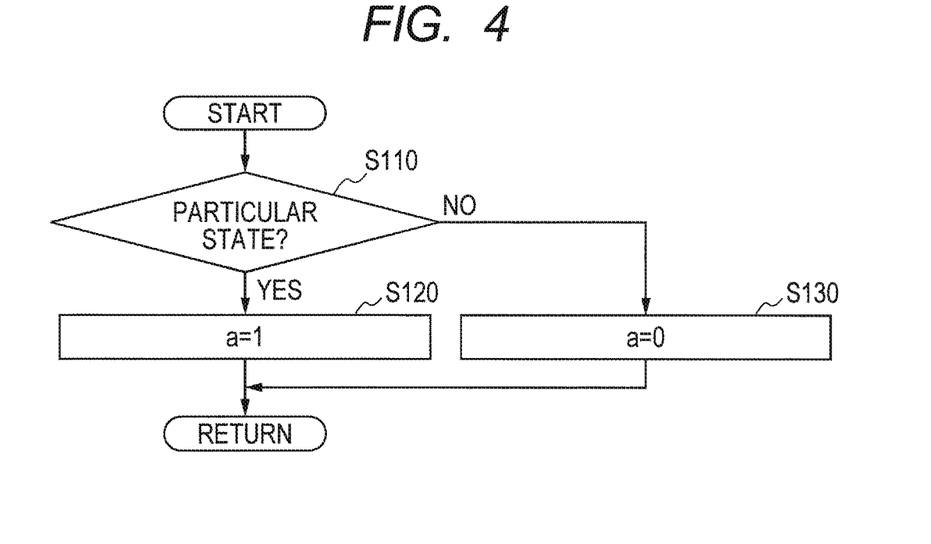
FIG. 4 is a flowchart showing the processing executed by a switcher.

The switcher 29 repeatedly executes the processing shown in FIG. 4 and thereby controls the updater 27 such that, in response to determining that the controlled object system 50 is in a particular state where external force that acts on the controlled object system 50 is known, the updater 27 learns (updates) the inertia J, the viscous friction coefficient D, and the coulomb friction fc.

Specifically, the switcher 29 controls the updater 27 such that, in response to determining that the controlled object system 50 is in a particular state where no external force acts on the controlled object system 50, the updater 27 learns the inertia J, the viscous friction coefficient D, and the coulomb friction fc.

Upon starting the processing shown in FIG. 4, the switcher 29 determines whether the controlled object system 50 is in a particular state based on output of the sensor 57 included in the controlled object system 50 (S110). The sensor 57 is disposed in the controlled object system 50 in order to detect whether the controlled object system 50 is in the particular state.

In response to determining that the controlled object system 50 is in the particular state (S110: Yes), the switcher 29 sets a variable a=1 to the updater 27, thereby permitting learning by the updater 27 (S120). The variable "a" corresponds to a learning permission flag of the parameter ρ.

In response to determining that the controlled object system 50 is not in the particular state (S110: No), the switcher 29 sets the variable a=0 to the updater 27, thereby prohibiting learning by the updater 27 (S130).

By repeatedly executing the above-mentioned processing S110-S130, depending on whether the controlled object system 50 is in the particular state, the switcher 29 permits or prohibits learning of the inertia J, the viscous friction coefficient D, and the coulomb friction fc by the updater 27.

Figure 5:
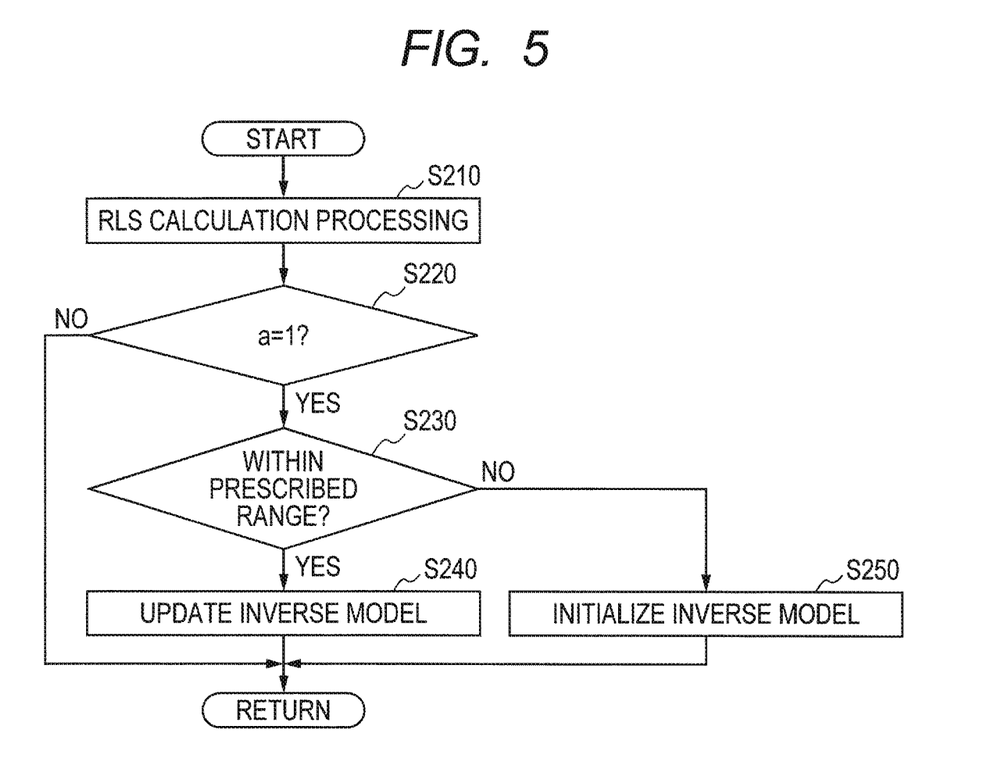
FIG. 5 is a flowchart showing the processing executed by an updater.

The updater 27 operates in parallel with the switcher 29 and, by repeatedly executing the processing shown in FIG. 5, operates to learn the inertia J, the viscous friction coefficient D, and the coulomb friction fc and to update the values of the parameter ρ in the estimator 25.

Upon starting the processing shown in FIG. 5, the updater 27 executes an RLS calculation processing (S210). The RLS calculation processing is processing of calculating, as learning values, the values of the inertia J, the viscous friction coefficient D, and the coulomb friction fc that minimize an error of the external force estimation value E of the estimator 25 relative to the real external force by using a recursive least square (RLS) method, based on the control input u from the controller 23 to the controlled object system 50 and on the control output y measured by the measurement system 70.

Specifically, the updater 27 calculates, as the learning values, a value ρ(k) of the inertia J, the viscous friction coefficient D, and the coulomb friction fc that minimize the error in accordance with expression (3) below (S210).

[Expression 3]

$$\rho(k) = \rho(k-1) + a\frac{P(k-1)\theta(k)}{\lambda + \theta^T(k)P(k-1)\theta(k)}\varepsilon(k) \quad (3)$$

$$\varepsilon(k) = x(k) - \theta^T(k)\rho(k-1)$$

$$P(k) = \frac{1}{\lambda}\left\{P(k-1) - a\frac{P(k-1)\theta(k)\theta^T(k)P(k-1)}{\lambda + \theta^T(k)P(k-1)\theta(k)}\right\}$$

Here, superscript T denotes a transpose symbol. That is, $\theta^T(k)$ is the transposed matrix of $\theta(k)$. A value λ corresponds to a forgetting coefficient that is larger than 0 and smaller than or equal to 1, and is set by a designer of the system. The flag "a" is the above-mentioned learning permission flag, and has the value of 0 or 1.

Further, x(k) corresponds to the control input u at time k (x(k)=u).

The time k is time of execution of the RLS calculation processing, and time k−1 is time of the previous execution of the RLS calculation processing. A vector θ(k) is defined as the vector shown below that includes the control output y at time k and the time derivative dy/dt of the control output y.

[Expression 4]

$$\theta(k) = \begin{bmatrix} dy/dt \\ t \\ \text{sign}(y) \end{bmatrix}$$

A vector ρ(k) is defined as the vector shown below that includes the inertia J, the viscous friction coefficient D, and the coulomb friction fc at time k.

$$\rho(k) = [J\,D\,f_c] \quad \text{[Expression 5]}$$

Identification of the inertia J, the viscous friction coefficient D, and the coulomb friction fc is realized by solving a problem of minimizing the value of an evaluation function Q(ρ) that corresponds to the square error between the external force estimation value E and the real external force F.

$$Q(\rho) = \|F - E(\rho)\|^2 \quad \text{[Expression 6]}$$

Here, the external force estimation value E(ρ) is represented as below.

[Expression 7]

$$E(\rho) = x - \rho\theta$$

$$x = u$$

$$\theta = \begin{bmatrix} dy/dt \\ t \\ \text{sign}(y) \end{bmatrix}$$

$$\rho = [J\ D\ f_c]$$

Thus, when the external force is zero (F=0), the inertia J, the viscous friction coefficient D, and the coulomb friction fc can be identified by obtaining the value ρ that minimizes the evaluation function Q(ρ) shown below.

$$Q(\rho)=\|x-\rho\theta\|^2 \quad \text{[Expression 8]}$$

This minimization problem can be solved by using the recursive least square method based on the expression (3) shown above. In this way, the learning processing in S210 is processing of identifying the inertia J, the viscous friction coefficient D, and the coulomb friction fc in the controlled object system 50 by calculating, as the learning value, the inertia J, the viscous friction coefficient D, and the coulomb friction fc that minimize the error between the external force estimation value E and the real external force based on the recursive least square method.

Specifically, in S210, when the variable a=1, the learning values of the inertia J, the viscous friction coefficient D, and the coulomb friction fc are validly calculated based on the control input u and the control output y. When the variable a=0, no valid learning is performed, and the learning values of the inertia J, the viscous friction coefficient D, and the coulomb friction fc are formally calculated to be the same values as the values of the previous time.

Upon ending the processing in S210, the updater 27 determines whether a=1 (S220). In response to determining that a is not 1 (S220: No), the updater 27 ends the processing shown in FIG. 5, without updating the parameter ρ of the estimator 25.

In response to determining that a=1 (S220: Yes), the updater 27 determines whether the learning value ρ(k) calculated in S210 is within a prescribed range (S230). The prescribed range is defined as a combination of a normal range of the inertia J, a normal range of the viscous friction coefficient D, and a normal range of the coulomb friction fc that are preliminarily set.

In response to determining that all the learning values of the inertia J, the viscous friction coefficient D, and the coulomb friction fc calculated in S210 are within the normal range, the updater 27 determines that the learning value ρ(k) is within the prescribed range. In the other cases, the updater 27 determines that the learning value ρ(k) is not within the prescribed range.

In response to determining that the learning value ρ(k) is within the prescribed range (S230: Yes), the updater 27 updates the parameter p of the estimator 25 with the learning value ρ(k) calculated in S210, thereby updating the inverse model 250 of the estimator 25 (S240).

That is, the updater 27 updates (changes) the combination of the inertia J, the viscous friction coefficient D, and the coulomb friction fc of the inverse model 250 in the estimator 25 to the learning value ρ(k) calculated in S210 (S240). After that, the updater 27 ends the processing shown in FIG. 5 for the moment.

In response to determining that the learning value ρ(k) is outside the prescribed range in S230 (S230: No), the updater 27 returns the inertia J, the viscous friction coefficient D, and the coulomb friction fc of the inverse model 250 in the estimator 25 to predetermined initial values (S250), and ends the processing shown in FIG. 5 for the moment.

By repeatedly executing the above-described processing of S210 to S250, the updater 27 learns the inertia J, the viscous friction coefficient D, and the coulomb friction fc when the controlled object system 50 is in the particular state, and updates the parameter ρ of the estimator 25 with the learning value if the learning value is within the prescribed range.

Figure 6:
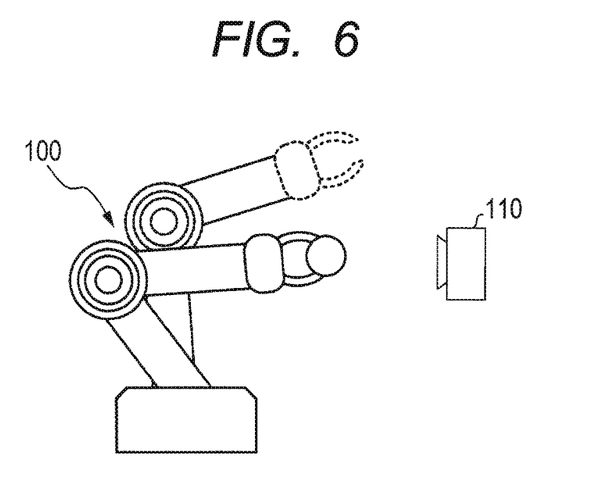
FIG. 6 is a diagram showing a first specific example of the controlled object system.

Here, specific examples of the controlled object system 50 to which the control system 10 of the present embodiment is applied will be described. As shown in FIG. 6, a first specific example of the controlled object system 50 is a robot arm 100 that is driven by the motor 53.

The robot arm 100 grabs and moves an object by receiving power from the motor 53. In this case, the sensor 57 may be an image sensor 110 that detects the object grabbed by the robot arm 100 based on a shot image.

The control system 10 determines, as the above-mentioned particular state, a state where the robot arm 100 grabs no object based on output signals from the image sensor 110. And, only in a state where the robot arm 100 grabs no object, the control system 10 sets the variable a=1 to cause the updater 27 to perform learning update of the parameter ρ of the estimator 25.

Figure 7:
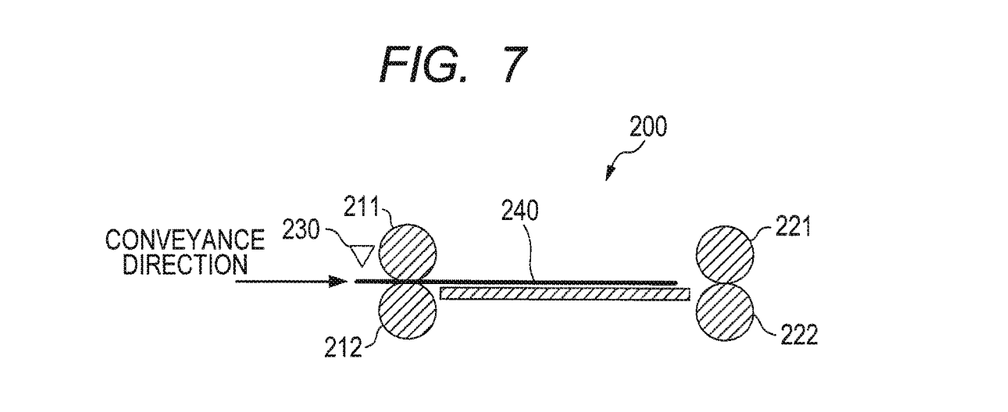
FIG. 7 is a diagram showing a second specific example of the controlled object system.

As shown in FIG. 7, a second specific example of the controlled object system 50 is a sheet conveyance system 200 that conveys a sheet 240 from an upstream side to a downstream side due to rotations of rollers 211, 212 arranged at the upstream side in the sheet conveyance direction and rollers 221, 222 arranged at the downstream side.

The motor 53 is connected to the rollers 211, 221 through a power transmission mechanism (not shown) and causes the rollers 211, 221 to rotate. The sheet conveyance system 200 exerts mechanical action to the sheet 240 due to rotations of the rollers 211, 221, and conveys the sheet 240 to the downstream side.

The sensor 57 in this case may be a sheet detection sensor 230 that is disposed at the upstream side of the sheet conveyance system 200, specifically, at the upstream side of the roller 211. The sheet detection sensor 230 may be configured to detect the sheet 240 that is in contact with or adjacent to the roller 211 and to switch ON and OFF an output signal depending on whether the sheet 240 exists. Specific examples of the sheet detection sensor 230 include a mechanical sensor configured to detect a sheet by contacting the sheet and an optical sensor configured to optically detect an existence of a sheet.

The sheet conveyance system 200 receives external force due to mechanical action from the sheet 240 that is an object supplied from the outside. In other words, in a state where the sheet 240 is not supplied from the upstream side, basically no external force acts on the sheet conveyance system 200.

Thus, the control system 10 sets a=1 in response to determining that the controlled object system 50 is in the particular state when the sheet 240 is not detected by the sheet detection sensor 230, and sets a=0 in other cases, thereby controlling the learning and update operation of the updater 27.

Figure 8:
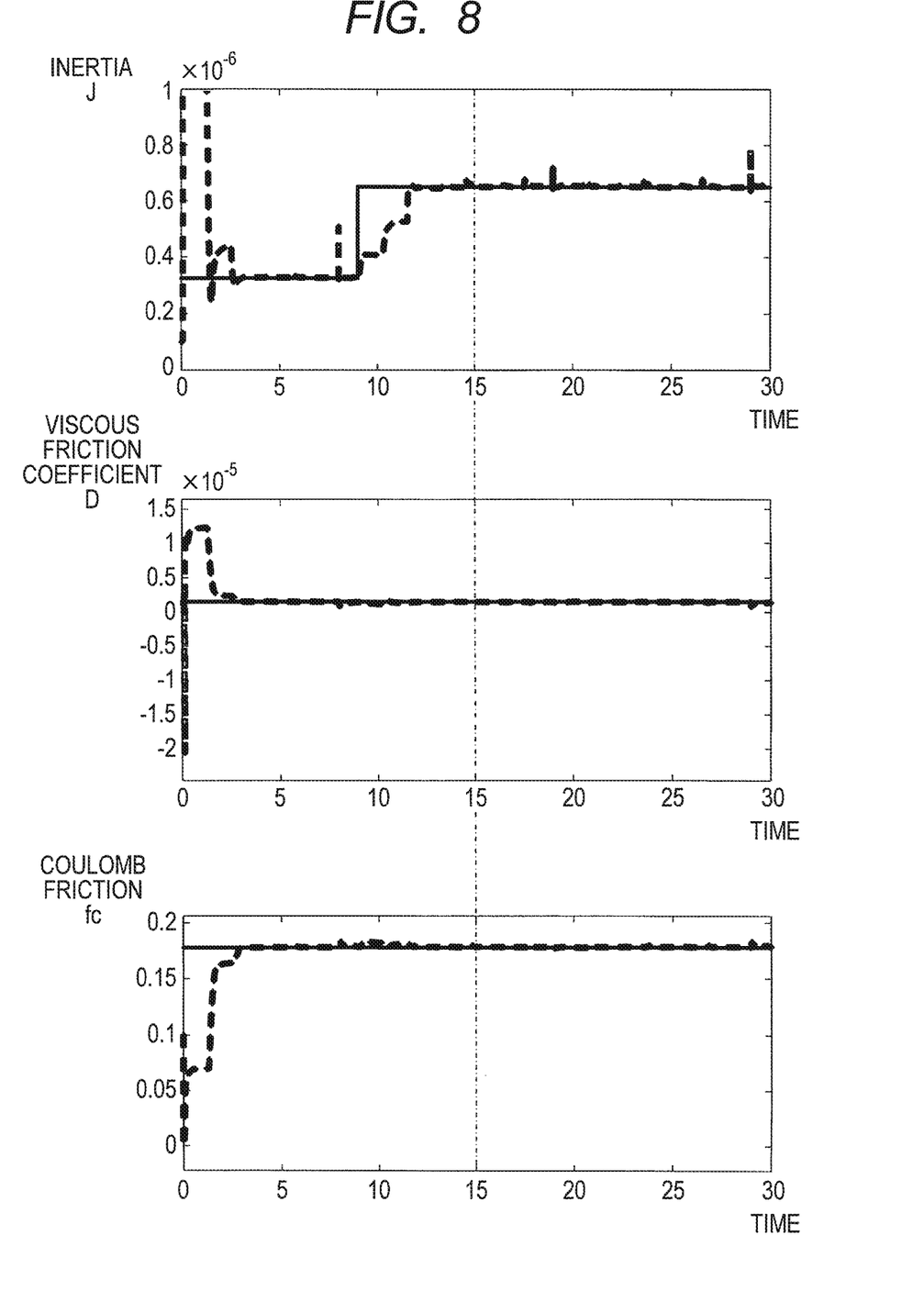
FIG. 8 shows graphs showing learning values of inertia, viscous friction coefficient, and coulomb friction obtained by experiments, together with real values.
Figure 9:
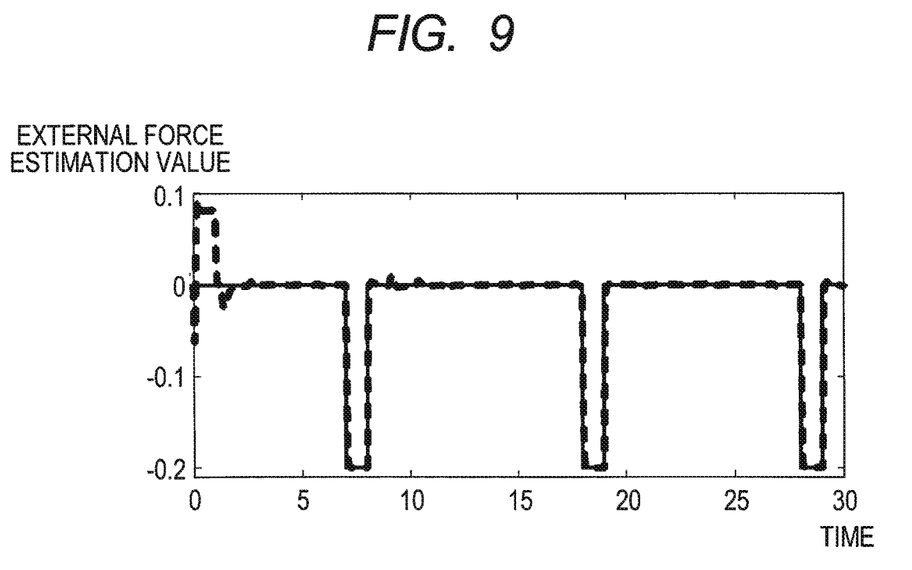
FIG. 9 shows a graph showing external force estimation values obtained by experiments, together with real values.

FIG. 8 shows learning values of the inertia J, the viscous friction coefficient D, and the coulomb friction fc that were obtained by experiments in which the control system 10 of the present embodiment is applied to the sheet conveyance system 200, together with real values. In FIG. 8, the real values are shown by the solid lines, and the learning values are shown by the dashed lines. Further, FIG. 9 shows the external force estimation value E in a case where the parameter p of the estimator 25 is updated by using these learning value, together with real values of the external force. In FIG. 9, the real values are shown by the solid lines, and the external force estimation values E are shown by the dashed lines.

In this experiment, in a period in which the external force is zero based on output of the sheet detection sensor 230, the variable a is switched to 1 and a learning operation is performed. As can be understood from this example, according to the present embodiment, the inertia J, the viscous friction coefficient D, and the coulomb friction fc are learned accurately and the estimation accuracy of the external force by the estimator 25 improves.

According to the control system 10 of the present embodiment described above, when it is detected by using the sensor 57 that the controlled object system 50 is in the particular state where no external force acts thereon, the learning operation of the parameter ρ of the estimator 25 is enabled so as to realize learning of the parameter ρ in the direction of minimizing the external force estimation value E of the estimator 25 by using the recursive least square method. In contrast, when the controlled object system 50 is not in the particular state, the learning operation is not executed substantially.

In an environment where the estimator 25 is provided, in many cases, no force sensor is provided that detects magnitude of external force with accuracy equivalent to or higher than the accuracy of the estimator 25. This is because, if such force sensor is provided, the estimator 25 becomes unnecessary.

On the other hand, in learning of the parameter ρ in the estimator 25, unknown external force leads to erroneous learning. In the present embodiment, such erroneous learning is suppressed by selectively enabling the learning operation in a state where it is determined that external force is zero by using the sensor 57 which is different from the above-mentioned force sensor.

Thus, according to the present embodiment, without introducing a force sensor with high accuracy, the estimator 25 configured to estimate external force with high accuracy and the control system 10 including such estimator 25 can be provided. In particular, in the present embodiment, it is determined whether external force is acting on the controlled object system 50 by utilizing a simple sensor or a sensor provided at the controlled object system 50 for another purpose, and the learning operation is switched ON and OFF. Hence, the control system 10 and the estimator 25 of high performance can be provided at reduced cost.

Further, in the present embodiment, it is unnecessary to input, to the controlled object system 50, a special signal such as a sine wave command in the related art and to cause the controlled object system 50 to execute a special operation that may cause a defect and malfunction for the purpose of estimation of external force.

In this way, the control system 10 of the present embodiment learns and identifies the inertia J, the viscous friction coefficient D, and the coulomb friction fc with high accuracy without a special operation that may cause a defect and malfunction, and serves this result for improving and maintaining the estimation accuracy of external force in the estimator 25.

In the present embodiment, when the learning value is outside the prescribed range, it is also beneficial to return the parameter of the estimator 25 to the initial value without reflecting the learning value in the estimator 25. There is a possibility that, due to unexpected factor, the particular state determined by using the sensor 57 is actually a state where external force acts on the controlled object system 50. If the learning value calculated by the learning operation in the state where unexpected external force acts is reflected in the estimator 25, there is a possibility that the estimation accuracy of external force by the estimator 25 drops significantly.

In the present embodiment, by returning the parameter of the estimator 25 to the initial value, the effects exerted on the estimator 25 by erroneous learning can be suppressed. This suppresses deterioration of the estimation accuracy of external force due to the above-mentioned factor.

While the disclosure has been described in detail with reference to the above aspects thereof, it would be apparent to those skilled in the art that various changes and modifications may be made therein without departing from the scope of the claims. For example, the above-described control system 10 may be applied to various types of the controlled object system 50 in addition to the robot arm 100 and the sheet conveyance system 200. Further, the technique of this disclosure may be applied to a feed-forward control system.

In the above-described embodiment, the learning and updating operation in the updater 27 is enabled in a state where external force is zero. Alternatively, the control system 10 may be operated such that it is set to a=1 for enabling the learning and updating operation in the updater 27 in a particular state where external force is not zero but is known, and that it is set to a=0 for disabling the learning and updating operation in the updater 27 in other states. In this case, ρ(k) may be calculated by replacing ε(k) included in the expression (3) with ε(k)−F0 using a value F0 of the known external force.

In a particular state where external force is not zero but is known, the external force in the particular state may be estimated in advance. For example, in a case where a basket is held by a robot arm and it is desired to know external force that acts on the arm due to an object put in the basket, external force may be estimated in a state where the robot arm holds only the basket and the estimated external force may be set to F0.

A function of one element in the above-described embodiments may be distributedly provided in a plurality of elements. Functions of a plurality of elements may be integrated into one element. A part of the configuration in the above-described embodiments may be omitted. At least part of the configuration in one embodiment may be added to configurations in another embodiment, or may be replaced by a configuration in another embodiment.

What is claimed is:

1. A method of, based on a control input to a controlled object and on a control output from the controlled object, updating a value of a parameter in an estimator configured to estimate external force that acts on the controlled object, the method comprising:
   (a) determining whether the controlled object is in a particular state in which external force that acts on the controlled object is known, the controlled object including a motor and a roller that is driven by the motor, the controlled object being a conveyance system configured to convey a sheet to a downstream side by rotation of the roller, wherein the determining includes determining that the controlled object is in the particular state when a sensor provided upstream of the roller does not detect the sheet and determining that the controlled object is not in the particular state when the sensor detects the sheet;
   (b) calculating, as a learning value, the value of the parameter that reduces an error between the known external force and estimated external force, the estimated external force being estimated by the estimator based on the control input and the control output, wherein the calculating includes, calculating, as the learning value, the value of the parameter that minimizes the error by a recursive least square (RLS)

method, and wherein the calculating, as the learning value, the value of the parameter by the RLS method includes:
calculating, as the learning-value, a value p(k) of an inertia J, a viscous friction coefficient D, and a coulomb friction fc that minimize the error in accordance with Expression A,
where superscript T denotes a transpose symbol, a value λ, corresponds to a forgetting coefficient that is larger than 0 and smaller than or equal to 1, a flag "a" is a learning permission flag having a value of 1 when it is determined that the controlled object is in the particular state and a value of 0 when it is determined that the controlled object is not in the particular state, x(k) corresponds to the control input u at time k (x(k)=u), the time k is time of execution of RLS calculation processing, and time k−1 is time of a previous execution of the RLS calculation processing, a vector θ(k) is defined as shown in Expression B that includes the control output y at time k and a time derivative dy/dt of the control output y, and the vector p(k) is defined as shown in Expression C that includes the inertia J, the viscous friction coefficient D, and the coulomb friction fc at time k;

[Expression A]

$$\rho(k) = \rho(k-1) + a\frac{P(k-1)\theta(k)}{\lambda + \theta^T(k)P(k-1)\theta(k)}\varepsilon(k)$$

$$\varepsilon(k) = x(k) - \theta^T(k)\rho(k-1)$$

$$P(k) = \frac{1}{\lambda}\left\{P(k-1) - a\frac{P(k-1)\theta(k)\theta^T(k)P(k-1)}{\lambda + \theta^T(k)P(k-1)\theta(k)}\right\}$$

[Expression B]

$$\theta(k) = \begin{bmatrix} dy/dt \\ t \\ \text{sign}(y) \end{bmatrix}$$

[Expression C]

$$\rho(k) = [J \ D \ f_c]$$

(c) updating the value of the parameter in the estimator with the calculated learning value on condition that the controlled object is in the particular state, without updating the value of the parameter in the estimator with the calculated learning value on condition that the controlled object is not in the particular state; and
(d) controlling the controlled object based on the updated value of the parameter in the estimator; and
repeating (a) to (d).

2. The updating method according to claim 1, wherein the particular state is a state where the external force is zero; and
wherein the calculating includes calculating the learning value of the parameter that reduces the estimated external force.

3. The updating method according to claim 1, wherein the estimator includes a rigid body model, a viscous friction model, and a coulomb friction model that correspond to the controlled object for estimation of the external force; and
wherein the parameter to be updated includes an inertia that defines the rigid body model, a viscous friction coefficient that defines the viscous friction model, and a coulomb friction that defines the coulomb friction model.

4. The updating method according to claim 1, wherein the updating includes:
in a case where the calculated learning value is within a particular range, updating the value of the parameter to the calculated learning value; and
in a case where the calculated learning value is outside the particular range, returning the value of the parameter to an initial value.

5. The updating method according to claim 1, wherein the controlled object is a mechanism that moves an action target body by mechanical action; and
wherein the determining includes determining that the controlled object is in the particular state on condition that a sensor does not detect a state where the action target body is in contact with or adjacent to the controlled object.

6. A non-transitory computer readable storage medium storing a set of program instructions for updating a value of a parameter in an estimator configured to estimate external force that acts on a controlled object based on a control input to the controlled object and on a control output from the controlled object, the set of program instructions, when executed by a computer of a control system, causing the control system to perform:
(a) determining whether the controlled object is in a particular state in which external force that acts on the controlled object is known, the controlled object including a motor and a roller that is driven by the motor, the controlled object being a conveyance system configured to convey a sheet to a downstream side by rotation of the roller, wherein the determining includes determining that the controlled object is in the particular state when a sensor provided upstream of the roller does not detect the sheet and determining that the controlled object is not in the particular state when the sensor detects the sheet;
(b) calculating, as a learning value, the value of the parameter that reduces an error between the known external force and estimated external force, the estimated external force being estimated by the estimator based on the control input and the control output, wherein the calculating includes, calculating, as the learning value, the value of the parameter that minimizes the error by a recursive least square (RLS) method, and wherein the calculating, as the learning value, the value of the parameter by the RLS method includes:
calculating, as the learning-value, a value p(k) of an inertia J, a viscous friction coefficient D, and a coulomb friction fc that minimize the error in accordance with Expression A,
where superscript T denotes a transpose symbol, a value λ, corresponds to a forgetting coefficient that is larger than 0 and smaller than or equal to 1, a flag "a" is a learning permission flag having a value of 1 when it is determined that the controlled object is in the particular state and a value of 0 when it is determined that the controlled object is not in the particular state, x(k) corresponds to the control input u at time k (x(k)=u), the time k is time of execution of RLS calculation processing, and time k−1 is time of a previous execution of the RLS calculation processing, a vector θ(k) is defined as shown in Expression B that includes the control output y at time k and a time derivative dy/dt of the control output y, and the vector p(k) is defined as shown in Expression C that includes the inertia J, the viscous friction coefficient D, and the coulomb friction fc at time k;

$$\rho(k) = \rho(k-1) + a\frac{P(k-1)\theta(k)}{\lambda + \theta^T(k)P(k-1)\theta(k)}\varepsilon(k) \quad \text{[Expression A]}$$

$$\varepsilon(k) = x(k) - \theta^T(k)\rho(k-1)$$

$$P(k) = \frac{1}{\lambda}\left\{P(k-1) - a\frac{P(k-1)\theta(k)\theta^T(k)P(k-1)}{\lambda + \theta^T(k)P(k-1)\theta(k)}\right\}$$

$$\theta(k) = \begin{bmatrix} dy/dt \\ y \\ \text{sign}(y) \end{bmatrix} \quad \text{[Expression B]}$$

$$\rho(k) = [J \quad D \quad f_c]; \quad \text{[Expression C]}$$

(c) updating the value of the parameter in the estimator with the calculated learning value on condition that the controlled object is in the particular state, without updating the value of the parameter in the estimator with the calculated learning value on condition that the controlled object is not in the particular state; and (d) controlling the controlled object based on the updated value of the parameter in the estimator; and repeating (a) to (d).

7. A control system comprising:

a controller configured to:

(a) estimate external force that acts on a controlled object based on a control input inputted to the controlled object by the controller and on a control output from the controlled object;

(b) determine whether the controlled object is in a particular state in which external force that acts on the controlled object is known, the controlled object including a motor and a roller that is driven by the motor, the controlled object being a conveyance system configured to convey a sheet to a downstream side by rotation of the roller, wherein the determining includes determining that the controlled object is in the particular state when a sensor provided upstream of the roller does not detect the sheet and determining that the controlled object is not in the particular state when the sensor detects the sheet;

(c) calculate, as a learning value, a value of a parameter that reduces an error between the known external force and estimated external force, the estimated external force being estimated by the controller based on the control input and the control output, wherein the calculate step includes, calculating, as the learning value, the value of the parameter that minimizes the error by a recursive least square (RLS) method, and wherein the calculate step further includes repeatedly calculating, as the learning value, the value of the parameter by the RLS method includes:

calculating, as the learning-value, a value p(k) of an inertia J, a viscous friction coefficient D, and a coulomb friction fc that minimize the error in accordance with Expression A, where superscript T denotes a transpose symbol, a value λ, corresponds to a forgetting coefficient that is larger than 0 and smaller than or equal to 1, a flag "a" is a learning permission flag having a value of 1 when it is determined that the controlled object is in the particular state and a value of 0 when it is determined that the controlled object is not in the particular state, x(k) corresponds to the control input u at time k (x(k)=u), the time k is time of execution of RLS calculation processing, and time k−1 is time of a previous execution of the RLS calculation processing, a vector θ(k) is defined as shown in Expression B that includes the control output y at time k and a time derivative dy/dt of the control output y, and the vector p(k) is defined as shown in Expression C that includes the inertia J, the viscous friction coefficient D, and the coulomb friction fc at time k;

$$\rho(k) = \rho(k-1) + a\frac{P(k-1)\theta(k)}{\lambda + \theta^T(k)P(k-1)\theta(k)}\varepsilon(k) \quad \text{[Expression A]}$$

$$\varepsilon(k) = x(k) - \theta^T(k)\rho(k-1)$$

$$P(k) = \frac{1}{\lambda}\left\{P(k-1) - a\frac{P(k-1)\theta(k)\theta^T(k)P(k-1)}{\lambda + \theta^T(k)P(k-1)\theta(k)}\right\}$$

$$\theta(k) = \begin{bmatrix} dy/dt \\ y \\ \text{sign}(y) \end{bmatrix} \quad \text{[Expression B]}$$

$$\rho(k) = [J \quad D \quad f_c]; \quad \text{[Expression C]}$$

(d) update the value of the parameter in the controller with the calculated learning value on condition that the controlled object is in the particular state, without updating the value of the parameter in the controller with the calculated learning value on condition that the controlled object is not in the particular state; and (e) control the controlled object based on the updated value of the parameter; and repeat (b) to (e).

* * * * *

UNITED STATES PATENT AND TRADEMARK OFFICE
CERTIFICATE OF CORRECTION

PATENT NO. : 11,586,162 B2
APPLICATION NO. : 16/668139
DATED : February 21, 2023
INVENTOR(S) : Eisuke Takahashi It is certified that error appears in the above-identified patent and that said Letters Patent is hereby corrected as shown below:

In the Specification

Column 6, Line 35 should read:
[Expression 4]

$$\theta(k) = \begin{bmatrix} dy/dt \\ y \\ sign(y) \end{bmatrix}$$

Column 6, Line 55 should read:
[Expression 7]

$$E(p) = x - p\theta$$
$$x = u$$
$$\theta = \begin{bmatrix} dy/dt \\ y \\ sign(y) \end{bmatrix}$$
$$p = [J \quad D \quad f_c]$$

In the Claims

Column 10, Claim 1, Line 65 should read:
wherein the calculating includes calculating, as the Column 11, Claim 1, Line 4 should read:
calculating, as the learning value, a value p(k) of an Signed and Sealed this
Seventeenth Day of October, 2023

Katherine Kelly Vidal
*Director of the United States Patent and Trademark Office*

CERTIFICATE OF CORRECTION (continued)
U.S. Pat. No. 11,586,162 B2

Column 11, Claim 1, Line 38 should read:

$$\theta(k) = \begin{bmatrix} dy/dt \\ y \\ \text{sign}(y) \end{bmatrix}$$

Column 12, Claim 6, Line 43 should read:
wherein the calculating includes calculating, as the Column 12, Claim 6, Line 49 should read:
calculating, as the learning value, a value p(k) of an Column 13, Claim 7, Line 51 should read:
wherein the calculating includes calculating Column 14, Claim 7, Lines 2-3 should read:
method, and wherein the calculating, as the learning,